(12) United States Patent
Horton et al.

(10) Patent No.: US 7,385,499 B2
(45) Date of Patent: Jun. 10, 2008

(54) ITEM-BASED MONITORING SYSTEMS AND METHODS

(75) Inventors: Mark Horton, Suwanee, GA (US); John Olsen, Cumming, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 52 days.

(21) Appl. No.: 11/015,243

(22) Filed: Dec. 17, 2004

(65) Prior Publication Data

US 2006/0145837 A1 Jul. 6, 2006

(51) Int. Cl.
G08B 1/08 (2006.01)
B60R 25/10 (2006.01)
G01C 21/30 (2006.01)

(52) U.S. Cl. ............ 340/539.13; 340/988; 340/426.19; 340/426.22; 701/208

(58) Field of Classification Search .................. None
See application file for complete search history.

(56) References Cited

U.S. PATENT DOCUMENTS

| | | | |
|---|---|---|---|
| 3,956,740 A | 5/1976 | Jones et al. | |
| 4,408,782 A | 10/1983 | Condon | |
| 4,832,204 A | 5/1989 | Handy et al. | |
| 4,850,009 A | 7/1989 | Zook et al. | |
| 5,014,206 A | 5/1991 | Scribner et al. | |
| 5,227,614 A | 7/1993 | Danielson et al. | |
| 5,292,004 A | 3/1994 | Cesarini | |
| 5,313,051 A | 5/1994 | Brigida et al. | |
| 5,325,303 A | 6/1994 | Walz et al. | |
| 5,347,274 A | 9/1994 | Hassett et al. | |
| 5,375,226 A | 12/1994 | Sano et al. | |
| 5,444,444 A | 8/1995 | Ross et al. | |
| 5,472,097 A | 12/1995 | Villachica | |
| 5,496,992 A | 3/1996 | Madan et al. | |
| 5,497,149 A | 3/1996 | Fast | |

(Continued)

FOREIGN PATENT DOCUMENTS

DE 44 12 097 C1 6/1995

(Continued)

OTHER PUBLICATIONS

International Search Report and Written Opinion for PCT/US2005/000729 dated Jan. 10, 2006.

(Continued)

*Primary Examiner*—Julie Lieu
(74) *Attorney, Agent, or Firm*—Alston & Bird LLP

(57) ABSTRACT

The present invention is generally directed to systems and methods for monitoring whether an item is properly delivered to a designated delivery point. According to one aspect of the invention, location data and timestamp data is generated in association with the transport and delivery of an item to a delivery point. The location and timestamp data can be compared, respectively, to at least one predetermined geographic boundary that defines a geographic area encompassing the designated delivery point, and to a scheduled time window within which delivery of the item is to occur. This information can be used to determine if a problem has arisen with regard to the transport and delivery of the item to the delivery point. The system is generally configured to generate one or more alerts if it is determined that a particular item has been transported or delivered in an unauthorized manner.

15 Claims, 7 Drawing Sheets

U.S. PATENT DOCUMENTS

| | | | |
|---|---|---|---|
| 5,500,516 A | 3/1996 | Durbin | |
| 5,506,580 A | 4/1996 | Whiting et al. | |
| 5,528,758 A | 6/1996 | Yeh | |
| 5,532,694 A | 7/1996 | Mayers et al. | |
| 5,534,684 A | 7/1996 | Danielson | |
| 5,593,267 A | 1/1997 | McDonald et al. | |
| 5,635,693 A | 6/1997 | Benson et al. | |
| 5,648,770 A | 7/1997 | Ross | |
| 5,650,967 A | 7/1997 | Seibert | |
| 5,682,379 A | 10/1997 | Mahany et al. | |
| 5,736,725 A | 4/1998 | Danielson | |
| 5,751,973 A | 5/1998 | Hassett et al. | |
| 5,764,774 A | 6/1998 | Liu | |
| 5,770,841 A | 6/1998 | Moed et al. | |
| 5,778,377 A | 7/1998 | Marlin et al. | |
| 5,780,778 A | 7/1998 | Schwartz et al. | |
| 5,790,429 A | 8/1998 | Baker et al. | |
| 5,797,134 A | 8/1998 | McMillan et al. | |
| 5,805,416 A | 9/1998 | Friend et al. | |
| 5,805,419 A | 9/1998 | Hundt et al. | |
| 5,808,564 A | 9/1998 | Simms et al. | |
| 5,822,739 A | 10/1998 | Kara | |
| 5,834,749 A | 11/1998 | Durbin | |
| 5,835,377 A | 11/1998 | Bush | |
| 5,855,006 A | 12/1998 | Huemoller et al. | |
| 5,862,500 A | 1/1999 | Goodwin | |
| 5,867,382 A | 2/1999 | McLaughlin | |
| 5,869,819 A | 2/1999 | Knowles et al. | |
| 5,884,238 A | 3/1999 | Noll et al. | |
| 5,905,232 A | 5/1999 | Schwartz et al. | |
| 5,919,239 A | 7/1999 | Fraker et al. | |
| 5,948,040 A | 9/1999 | DeLorme et al. | |
| 5,971,587 A | 10/1999 | Kato et al. | |
| 5,992,753 A | 11/1999 | Xu | |
| 5,993,098 A | 11/1999 | Osada | |
| 5,995,118 A | 11/1999 | Masuda | |
| 5,995,950 A | 11/1999 | Barns-Slavin et al. | |
| 6,003,773 A | 12/1999 | Durbin et al. | |
| 6,006,106 A | 12/1999 | Cook et al. | |
| 6,018,715 A | 1/2000 | Lynch et al. | |
| 6,034,379 A | 3/2000 | Bunte et al. | |
| 6,061,398 A | 5/2000 | Satoh et al. | |
| 6,064,970 A | 5/2000 | McMillan et al. | |
| 6,071,643 A | 6/2000 | Chino et al. | |
| 6,084,528 A | 7/2000 | Beach et al. | |
| 6,124,806 A | 9/2000 | Cunningham et al. | |
| 6,134,437 A | 10/2000 | Karabinis et al. | |
| 6,148,262 A | 11/2000 | Fry | |
| 6,173,209 B1 | 1/2001 | Laval et al. | |
| 6,175,826 B1 | 1/2001 | Malandra, Jr. et al. | |
| 6,189,702 B1 | 2/2001 | Bonnet | |
| 6,208,980 B1 | 3/2001 | Kara | |
| 6,211,781 B1 | 4/2001 | McDonald | |
| 6,241,099 B1 | 6/2001 | Hendrickson et al. | |
| 6,246,672 B1 | 6/2001 | Lumelsky | |
| 6,249,008 B1 | 6/2001 | Bunte et al. | |
| 6,285,916 B1 | 9/2001 | Kadaba et al. | |
| 6,329,919 B1 | 12/2001 | Boies et al. | |
| 6,332,098 B2 | 12/2001 | Ross et al. | |
| 6,408,233 B1 | 6/2002 | Solomon et al. | |
| 6,433,732 B1 | 8/2002 | Dutta et al. | |
| 6,459,969 B1 | 10/2002 | Bates et al. | |
| 6,493,550 B1 | 12/2002 | Raith | |
| 6,496,775 B2 | 12/2002 | McDonald, Jr. et al. | |
| 6,529,786 B1 | 3/2003 | Sim | |
| 6,571,197 B1 | 5/2003 | Frank et al. | |
| 6,648,770 B1 | 11/2003 | Snyder | |
| 6,731,940 B1 | 5/2004 | Nagendran | |
| 6,749,122 B1 | 6/2004 | Koenck et al. | |
| 6,756,918 B2 | 6/2004 | Fomukong | |
| 6,801,850 B1 | 10/2004 | Wolfson | |
| 6,819,267 B1 | 11/2004 | Edmark et al. | |
| 6,868,386 B1 | 3/2005 | Henderson et al. | |
| 6,885,991 B2 | 4/2005 | Skonberg et al. | |
| 6,889,194 B1 | 5/2005 | Kadaba | |
| 6,895,329 B1 | 5/2005 | Wolfson | |
| 7,034,683 B2 | 4/2006 | Ghazarian | |
| 7,039,496 B2 | 5/2006 | Perez et al. | |
| 7,118,034 B2 | 10/2006 | Baldassari et al. | |
| 2002/0006806 A1 | 1/2002 | Kinnunen et al. | |
| 2002/0010604 A1 | 1/2002 | Block | |
| 2002/0024448 A1 | 2/2002 | Lykke | |
| 2002/0044084 A1 | 4/2002 | Masakazu et al. | |
| 2002/0065065 A1 | 5/2002 | Lunsford et al. | |
| 2002/0077060 A1 | 6/2002 | Lehikoinen et al. | |
| 2002/0082931 A1 | 6/2002 | Siegel et al. | |
| 2002/0085515 A1 | 7/2002 | Jaynes et al. | |
| 2002/0132632 A1 | 9/2002 | Brassil et al. | |
| 2002/0133437 A1 | 9/2002 | Ansley | |
| 2002/0137472 A1 | 9/2002 | Quinn et al. | |
| 2002/0156661 A1 | 10/2002 | Jones et al. | |
| 2003/0010822 A1 | 1/2003 | Davies et al. | |
| 2003/0040946 A1 | 2/2003 | Sprenger et al. | |
| 2003/0055689 A1 | 3/2003 | Block et al. | |
| 2003/0055690 A1 | 3/2003 | Garback | |
| 2003/0083060 A1 | 5/2003 | Menendez | |
| 2003/0109266 A1 | 6/2003 | Rafiah et al. | |
| 2003/0114206 A1 | 6/2003 | Timothy et al. | |
| 2003/0120526 A1 | 6/2003 | Altman et al. | |
| 2003/0144985 A1 | 7/2003 | Ebert | |
| 2003/0163287 A1 | 8/2003 | Vock et al. | |
| 2003/0224818 A1 | 12/2003 | Chikao et al. | |
| 2004/0243452 A1* | 12/2004 | Barton et al. ................ 705/7 |
| 2004/0249557 A1 | 12/2004 | Harrington et al. | |
| 2005/0017855 A1* | 1/2005 | Harvey .................... 340/426.1 |
| 2006/0047419 A1* | 3/2006 | Diendorf et al. ............ 701/208 |
| 2006/0164232 A1 | 7/2006 | Waterhouse et al. | |

FOREIGN PATENT DOCUMENTS

| | | |
|---|---|---|
| DE | 196 18 535 A1 | 7/1997 |
| EP | 0635800 A1 | 1/1995 |
| EP | 1 216 901 A1 | 6/2002 |
| GB | 2 225 459 A | 5/1990 |
| GB | 2 358 427 A | 7/2001 |
| GB | 2 363 884 A | 1/2002 |
| JP | 03-143824 | 6/1991 |
| JP | 04068942 | 3/1992 |
| JP | H6-333117 | 12/1994 |
| JP | 7-068222 | 3/1995 |
| JP | 07-199861 | 8/1995 |
| JP | 9-147032 | 11/1995 |
| JP | 9-305669 | 11/1997 |
| JP | 10-255166 | 9/1998 |
| JP | 11-347892 | 12/1999 |
| JP | 2001-209468 | 8/2001 |
| JP | 2001-278414 | 10/2001 |
| WO | WO 96/31846 | 10/1996 |
| WO | WO 01/91438 A1 | 11/2001 |
| WO | WO 03/014752 A1 | 2/2003 |
| WO | WO 03/081560 A1 | 10/2003 |

OTHER PUBLICATIONS

International Search Report for PCT/US2005/000729 dated Oct. 26, 2005.

International Search Report for PCT/US2005/000789 dated Jan. 10, 2006.

International Search Report for PCT/US2005/000789 dated Oct. 26, 2005.
Murphy, Jean V., "Yard Management Systems Extend Automation Beyond the Dock Door", SupplyChainBrain.com, Mar. 2005, Global Logistic & Supply Chain Strategies.

International Search Report for PCT/US05/42711 dated Jan. 16, 2008.

* cited by examiner

ITEM-BASED MONITORING SYSTEMS AND METHODS

FIELD OF THE INVENTION

To present invention relates generally to systems and methods for providing added security and visibility into the movement of items through a transportation system, and, more particularly, to systems that monitor whether an item is properly delivered to a designated delivery point.

BACKGROUND OF THE INVENTION

The tremendous volume of goods flowing through a transportation system on any given day creates a significant logistical challenge. As a result, tracking and visibility systems play an integral part in most transportation systems by allowing both customers and transportation personnel to track the flow of goods. However, despite the existence of such prior art systems, items flowing through a transportation system are, on occasion, still delivered to a location later than expected, misdelivered to an incorrect address, and even lost (or stolen) somewhere along the way. These and other such mishaps can be particularly troubling when the items being shipped are considered "high-value" items, based on either their relative importance to the shipper or on their raw economic value. Examples of high-value items can include shipments of diamonds, computer chips, cars or sensitive documents, to name just a few.

For the most part, item tracking services known in the art are passive in the sense that they are generally not designed to actively address the types of problems discussed above. Thus, for example, if an item is lost, stolen, behind schedule, or misdelivered to an incorrect address, such problems may go undetected until a shipper or consignee notices the problem and calls to report it. By then, however, a substantial amount of valuable time may have been lost, during which transportation and security personnel could have been looking into the problem. As such, the likelihood of being able to both diagnose and remedy the cause of any potential problems may have been inadvertently reduced.

Furthermore, while it may sometimes be possible to ship an item via special shipping channels that incorporate more stringent security measures, doing so may not always be desirable. Aside from the obvious fact that shipping the item in such a way can be substantially more expensive, the added security measures can, in some cases, create a new set of problems by drawing unnecessary attention to the item. In other words, by shipping the item via special shipping channels, the shipper may in effect be identifying the item to would-be criminals as a high value item. Thus, in some cases it may actually be safer to at least provide the appearance that the item is being shipped via standard means so that the item blends in and does not stand out as an item of particular value in the various shipping yards, hub locations and other transport points, which the item is likely to pass through.

Therefore, an unsatisfied need exists in the industry for improved systems and methods for monitoring whether an item is properly delivered to a designated delivery point that overcome the deficiencies in the prior art, some of which are discussed above.

BRIEF SUMMARY OF THE INVENTION

The present invention is generally directed to systems and methods for monitoring whether an item is properly delivered to a designated delivery point. According to one aspect of the invention, location data and timestamp data is generated in association with the transport and delivery of an item to a delivery point. The location and timestamp data can be compared, respectively, to at least one predetermined geographic boundary that defines a geographic area encompassing the designated delivery point, and to a scheduled time window within which delivery of the item is to occur. This information can be used to determine if a problem has arisen with regard to the transport and delivery of the item to the designated delivery point. In particular, if the location data indicates that the item is being delivered to a location that is not within the designated geo-fence, and/or if the timestamp data indicates that the item is being delivered during a time that exceeds the scheduled time window, a security alert can be generated by the system. Similarly, the absence of a data transmission confirming that the item has in fact been delivered to a designated delivery point, by a certain time, can also be used to trigger an alert.

In one embodiment of the present invention, a system for monitoring whether an item is properly delivered to a designated delivery point is described that includes a memory module for storing data relating to a geographic boundary, the geographic boundary defining an area around the designated delivery point within which physical delivery of the item is to occur; a data capture device for capturing a tracking number associated with the item proximate an actual delivery point to which the item has been transported; a location module for associating a geographic location with the actual delivery point; and a processing module operable to communicate with the memory module, the data capture device and the location module, the processing module configured for generating an alert in association with the item if it is determined that the actual delivery point is not located within the area defined by the geographic boundary.

In another embodiment of the present invention, a system for monitoring whether an item is properly delivered to a designated delivery point is described that includes a memory module for storing data relating to a geographic boundary, the geographic boundary defining an area around the designated delivery point within which physical delivery of the item is to occur; a data capture device for capturing a tracking number associated with the item proximate an actual delivery point to which the item has been transported; a location module for associating a geographic location with the actual delivery point; a timestamp module for associating a time and date with the capturing of the tracking number at the actual delivery point; and a processing module operable to communicate with the memory module, the data capture device, the location module and the timestamp module, the processing module configured for generating an alert in association with the item if it is determined that the actual delivery point is not located within the area defined by the geographic boundary, or if it is determined that the destination scan of the item has not occurred by the commit time.

In yet another embodiment of the present invention, a system for monitoring whether an item is properly delivered to a designated delivery point via a delivery vehicle is described that includes a memory module for: storing first data relating to a first geographic boundary, the first geographic boundary defining an area within which the delivery vehicle is to remain during the transporting of the item to the designated delivery point; and storing second data relating to a second geographic boundary, the second geographic boundary defining an area around the designated delivery point within which physical delivery of the item is to occur; a data capture device for capturing a tracking number associated with the item proximate an actual delivery point to which the item has been transported; a location module for monitoring the geographic location of the delivery vehicle and the item during the transport and delivery of the item to the actual delivery point; and a processing module operable to communicate with the memory module, the data capture device and the location module, the processing module configured for: generating a first alert in association with the item if it is determined that the delivery vehicle has traveled outside of the area defined by the first geographic boundary; and generating a second alert in association with the item if it is determined that the actual delivery point is not located within the area defined by the second geographic boundary.

In yet another embodiment of the present invention, a system for monitoring whether an item is properly delivered to a designated delivery point via a delivery vehicle is described that includes a memory module for: storing first data relating to a first geographic boundary, the first geographic boundary defining an area within which the delivery vehicle is to remain during the transporting of the item to the designated delivery point; and storing second data relating to a second geographic boundary, the second geographic boundary defining an area around the designated delivery point within which physical delivery of the item is to occur; a data capture device for capturing a tracking number associated with the item proximate an actual delivery point to which the item has been transported; a location module for monitoring the geographic location of the delivery vehicle and the item during the transport and delivery of the item to the actual delivery point; a timestamp module for associating a time and date with the capturing of the tracking number at the actual delivery point; and a processing module operable to communicate with the memory module, the data capture device, the location module and the timestamp module, the processing module configured for: generating a first alert in association with the item if it is determined that the delivery vehicle has traveled outside of the area defined by the first geographic boundary; and generating a second alert in association with the item if it is determined that the actual delivery point is not located within the area defined by the second geographic boundary, or if it is determined that the destination scan of the item has not occurred by the commit time.

In another embodiment of the present invention, a method of monitoring whether an item is properly delivered to a designated delivery point is described that includes the steps of: storing data relating to a geographic boundary in a storage device, the geographic boundary defining an area around the designated delivery point within which physical delivery of the item is to occur; performing a destination scan of the item at an actual delivery point to which the item has been transported, the destination scan used, at least in part, for indicating that the item has reached the actual delivery point; awaiting notification from a computing device configured to receive and process geographic location data during the transporting and delivery of the item to the actual delivery point, the notification including sufficient information to facilitate a determination of whether the actual delivery point is located within the geographic boundary; and generating an alert in association with the item if it is determined that the actual delivery point is not located within the area defined by the geographic boundary.

In yet another embodiment of the present invention, a method of monitoring whether an item is properly delivered to a designated delivery point is described that includes the steps of: storing data relating to a geographic boundary in a storage device, the geographic boundary defining an area around the designated delivery point within which physical delivery of the item is to occur; storing a commit time in the storage device by which the item is expected to be delivered to the designated delivery point; performing a destination scan of the item at an actual delivery point to which the item has been transported, the destination scan used, at least in part, for indicating that the item has reached the actual delivery point; awaiting notification from a computing device configured to receive and process geographic location data and time data during the transporting and delivery of the item to the actual delivery point, the notification including sufficient information to facilitate a determination of whether the actual delivery point is located within the geographic boundary and whether the destination scan occurred by the commit time; and generating an alert in association with the item if it is determined that the actual delivery point is not located within the area defined by the geographic boundary, or if it is determined that the destination scan of the item has not occurred by the commit time.

In yet another embodiment of the present invention, a method of monitoring whether an item is properly delivered to a designated delivery point via a delivery vehicle is described that includes the steps of: storing first data relating to a first geographic boundary in a storage device, the first geographic boundary defining an area within which the delivery vehicle is to remain during the transporting of the item to the designated delivery point; storing second data in the storage device relating to a second geographic boundary, the second geographic boundary defining an area around the designated delivery point within which physical delivery of the item is to occur; performing a destination scan of the item at an actual delivery point to which the item has been transported, the destination scan used, at least in part, for indicating that the item has reached the actual delivery point; awaiting one or more notifications from a computing device configured to receive and process geographic location data during the transporting and delivery of the item to the actual delivery point, the one or more notifications including sufficient information to facilitate a determination of whether the delivery vehicle has traveled outside of the area defined by the first geographic boundary, and whether the actual delivery point is located within the area defined by the second geographic boundary; generating a first alert in association with the item if it is determined that the delivery vehicle has traveled outside of the area defined by the first geographic boundary; and generating a second alert in association with the item if it is determined that the actual delivery point is not located within the area defined by the second geographic boundary.

In yet another embodiment of the present invention, a method of monitoring whether an item is properly delivered to a designated delivery point via a delivery vehicle is described that includes the steps of: storing first data relating to a first geographic boundary in a storage device, the first geographic boundary defining an area within which the delivery vehicle is to remain during the transporting of the item to the designated delivery point; storing second data in the storage device relating to a second geographic boundary, the second geographic boundary defining an area around the designated delivery point within which physical delivery of the item is to occur; storing a commit time in the storage device by which the item is expected to be delivered to the designated delivery point; performing a destination scan of the item at an actual delivery point to which the item has been transported, the destination scan used, at least in part, for indicating that the item has reached the actual delivery point;

This embodiment further includes the steps of: awaiting one or more notifications from a computing device configured to receive and process geographic location data and time data during the transporting and delivery of the item to the actual delivery point, the one or more notifications including sufficient information to facilitate a determination of: whether the delivery vehicle has traveled outside of the area defined by the first geographic boundary; whether the actual delivery point is located within the area defined by the second geographic boundary; or whether the destination scan of the item has occurred by the commit time; generating a first alert in association with the item if it is determined that the delivery vehicle has traveled outside of the area defined by the first geographic boundary; and generating a second alert in association with the item if it is determined that the actual delivery point is not located within the area defined by the second geographic boundary, or if it is determined that the destination scan of the item has not occurred by the commit time.

In yet another embodiment of the present invention, a method of monitoring the transport of an item through a transportation network is described that includes the steps of: storing data relating to a geographic boundary in a storage device, the geographic boundary defining an area within which the item is to remain during transport through the transportation network; scanning the item with a first portable scanning device at a first location; scanning the item with a stationary scanning device at a second location; scanning the item with a second portable scanning device at a third location; generating an alert in association with the item if it is determined that the first, second or third locations do not fall within the area defined by the geographic boundary.

In yet another embodiment of the present invention, a method of monitoring the transport of items through a transportation network is described that includes the steps of: storing first data relating to a first geographic boundary in a storage device, the first geographic boundary defining an area within which a first item is to remain during transport through the transportation network; storing second data relating to a second geographic boundary in a storage device, the second geographic boundary defining an area within which a second item is to remain during transport through the transportation network; scanning the first item with a first portable scanning device at a first location; scanning the first item with a stationary scanning device at a second location; scanning the first item with a second portable scanning device at a third location, the second portable scanning device being different from the first portable scanning device; and generating a first alert in association with the first item if it is determined that any one of the first, second or third locations falls outside the area defined by the first geographic boundary.

This embodiment further includes the steps of: scanning the second item with a third portable scanning device at a fourth location; scanning the second item with a stationary scanning device at the second location; scanning the second item with a fourth portable scanning device at a fifth location, the fourth portable scanning device being different from the third portable scanning device; and generating an alert in association with the second item if it is determined that any one of the fourth, second or fifth locations falls outside the area defined by the second geographic boundary.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
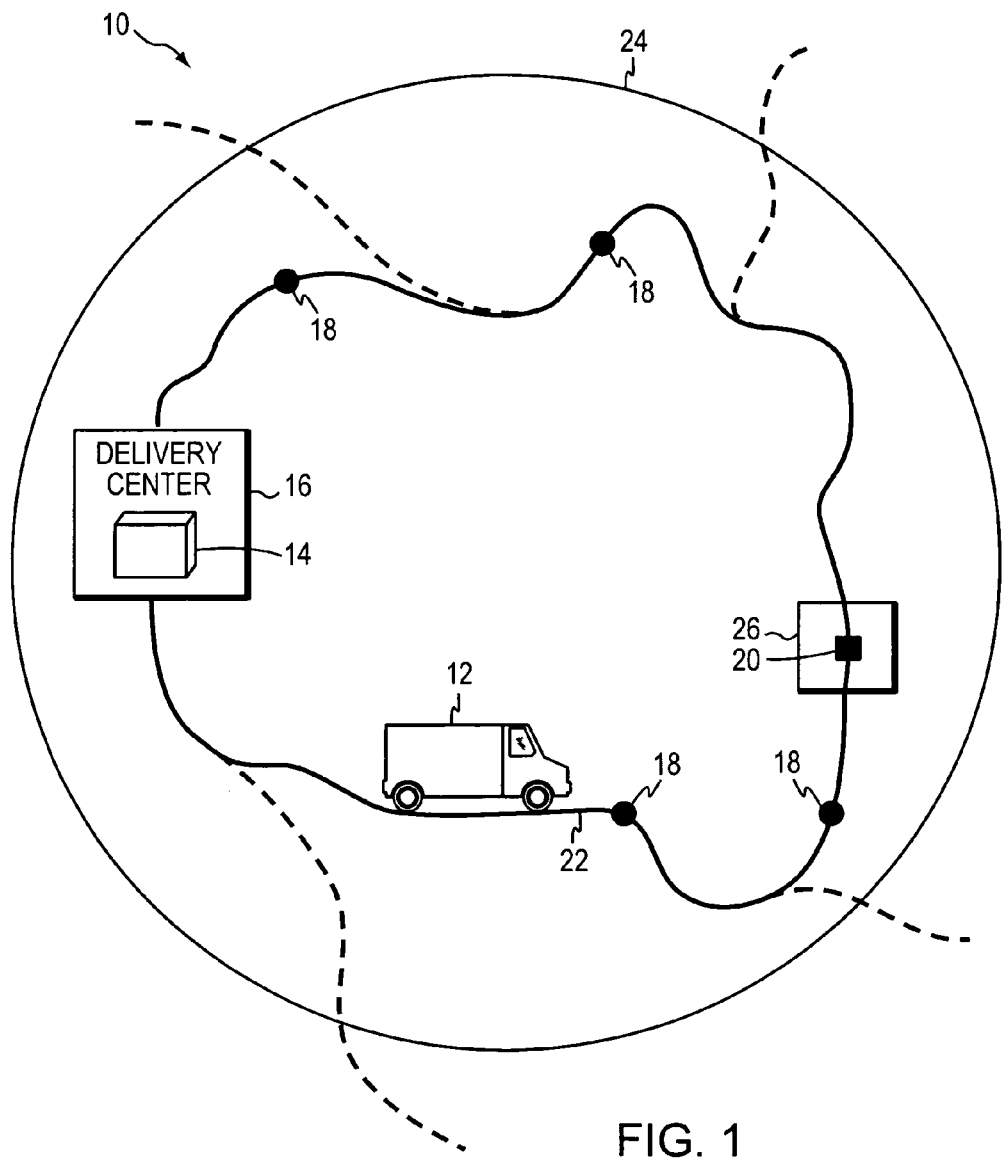
FIG. 1 illustrates a delivery monitoring system that includes a "geo-fencing feature" in accordance with an embodiment of the present invention.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Generally described, the present invention is directed to systems and methods for monitoring whether an item is properly delivered to a designated delivery point. To accomplish this, one or more "geo-fences" (or geographic boundaries) are defined to assist in monitoring events associated with the transport and delivery of the item to a delivery point. As used herein, the term "geo-fence" refers to a geographic boundary within which certain events are permitted (or not permitted) to occur; if the event (or non-event) occurs within the boundary one is deemed to be in geo-fence compliance, outside the boundary one is deemed to be in geo-fence violation (or vice versa, depending on convention).

According to one aspect of the invention, location (e.g., GPS) data and timestamp data is generated in association with the delivery of an item to a delivery point. As referred to herein, the term "delivery point" is used broadly to refer to any location to which an item is, or should be, transported as it travels along a path from a source location to a final destination location; thus, a "delivery point" can include any intermediate point, such as a hub or other such location within a transportation system, or a final destination location, to which the item is, or should be, transported. The location and timestamp data can be compared, respectively, to at least one predetermined geo-fence that defines a geographic area encompassing the designated delivery point, and to a scheduled time window within which delivery of the item is to occur. This information can be used to determine if a problem has arisen with regard to the transport and delivery of the item to the delivery point. In particular, if the location data indicates that the item is being delivered to a location that is not within the designated geo-fence, and/or if the timestamp data indicates that the item is being delivered during a time that exceeds the scheduled time window, a security alert will be generated by the system. Similarly, the absence of data confirming that the item has in fact been delivered to a designated delivery point, by a certain time, can also be used to trigger an alert.

FIG. 1 illustrates a delivery monitoring system 10 that includes a "geo-fencing feature" in accordance with an embodiment of the present invention. In this figure, a delivery vehicle 12 is shown delivering an item 14 from a delivery center 16 to a designated delivery point 20. In the embodiment shown, the delivery point 20 to which the item 14 is to be delivered is one of several delivery stops 18 located along a delivery route 22. This situation is illustrative of what may occur, for example, in the case of a package delivery company delivering items to one or more addresses located along a package delivery route. It should be noted, however, that while certain aspects of the present invention may be described in the context of a package delivery system, one of ordinary skill in the art will readily recognize that the monitoring systems described herein are equally advantageous with other types of delivery systems as well. In fact, the present invention can be used to provide added security and visibility into the movement of virtually any item that is being shipped towards a known delivery point.

Consider, for example, the situation shown in which the item 14 is to be transported from the delivery center 16 to the particular delivery point 20 via the delivery vehicle 12. According to one embodiment, a plurality of geo-fences (in this case two) can be set up to assist in monitoring the expected movement of the item 14 as it is transported from the delivery center 16 towards the delivery point 20. As described in detail below, the present invention helps to insure that the item 14 is properly delivered to the correct delivery point 20, and within a scheduled time (if applicable). The benefits provided by such a system can be particularly advantageous when transporting what may be considered "high value" items, such as diamonds, cars, currency, silicon chips, and even sensitive documents, to name just a few.

First, an outer geo-fence 24 can be defined so as to create a geographic area or zone within which the delivery vehicle 12 is authorized to move while transporting the item 14. The size and dimensions of the area defined by the outer geo-fence 24 can be determined in advance based at least in part on known parameters associated with the item 14. For example, if the item 14 is to be delivered to an address located along the designated delivery route 22 (as depicted in FIG. 1), then the outer geo-fence 24 would likely include a geographic area or zone that encompasses the entire delivery route. However, if in a different situation the item 14 is to be delivered directly from a first point to a second point, the outer geo-fence 24 could be limited to a narrow band that follows a particular pathway, which the delivery vehicle has been mandated to take while transporting the item 14. The amount of deviation permitted from any given course may, in some cases, depend on the level of scrutiny that is to be paid to each particular item 14 being transported by the delivery vehicle 12.

If the monitoring system 10 determines that the delivery vehicle 12 has traveled beyond the outer geo-fence 24 while transporting the item 14 to the delivery point 20, an alert can be generated in association with that item. As will be described in detail below, alerts can be generated in part by using one or more on-board computing devices equipped with GPS capability. In one embodiment, an on-board computing device 30 used by the driver of the delivery vehicle 12 is programmed to continuously compare the current location of the delivery vehicle to a set of known coordinates that define the outer geo-fence 24. If the computing device 30 determines that the vehicle 12 has traveled into an area beyond the outer geo-fence 24, an alert will be generated so as to notify the driver and/or appropriate transportation or security personnel.

To provide yet another layer of security, in the embodiment shown, an inner and more localized geo-fence 26 is defined around the designated delivery point 20. The inner geo-fence 26 basically defines an area within which physical delivery of the item 14 is deemed (or assumed) to be proper. In other words, if the monitoring system 10 determines that the item 14 has been delivered to a location within the geographic area defined by the inner geo-fence 26, then the system assumes that the item 14 has been delivered to the correct (i.e., designated) delivery point 20. If on the other hand, the system 10 determines that the item 14 has been delivered to a point located outside of the inner geo-fence 26, then an alert will be generated. In such a case, the alert would likely indicate to the driver of the delivery vehicle and/or to transportation or security personnel that a potential misdelivery of the item has occurred. This and other such alerts allow appropriate personnel to begin an immediate inquiry into what may have gone wrong with regard to the transport or final delivery of that particular item 14.

In addition to providing feedback on whether the item 14 is being transported along an appropriate shipping route (e.g., along a correct roadway, shipping lane, airway, etc.), and feedback on whether the item is being delivered to a proper delivery point 20, the system 10 can also be configured to monitor whether the item 14 is ultimately delivered to the correct location (or any location) within a certain time window. Thus, if the monitoring system 10 determines that the item 14 has not been delivered to the designated delivery point 20 within a predetermined time window then yet another alert can be generated to notify the appropriate personnel. This may occur, for example, when the item 14 is lost, stolen or simply in the process of being delivered behind schedule. The manner in which the monitoring system 10 is able to determine these and other aspects of the present invention is discussed below.

Figure 2:
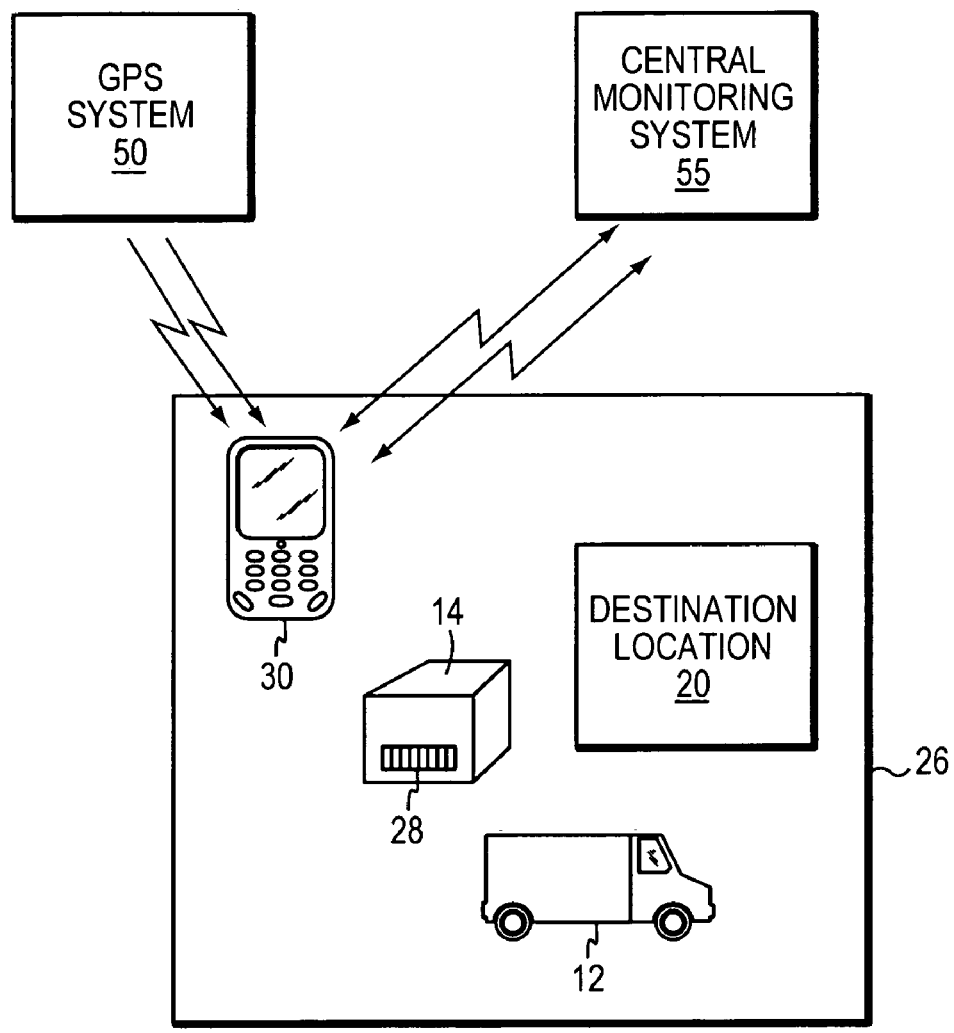
FIG. 2 illustrates the delivery of an item to a geo-fenced delivery point in accordance with an embodiment of the present invention.

Reference is now made to FIG. 2, which illustrates the delivery of the item 14 to the geo-fenced delivery point 20 of FIG. 1, in accordance with an embodiment of the present invention.

The inner geo-fence 26 shown around the designated delivery point 20 defines an area or zone within which delivery of the item 14 is expected to occur. In one embodiment, the inner geo-fence 26 can be set up to enclose an area approximately 1000 feet in radius from a selected point proximate the designated delivery point 20. The selected point may even be proximate a specific unloading area where unloading of the item 14 at the delivery point 20 is expected to occur. This distance is of course only exemplary and could be varied as needed. It may be seen that this geo-fence 26 is not circular. The inner geo-fence 26 can be configured to approximate the property line of the delivery point 20. In some cases, this may allow the monitoring system 10 to provide a more precise determination of whether or not delivery of the item 14 is occurring "on" or "off" the property. In other cases, a simple circle could be used if logistically appropriate. It should therefore be understood that it is not critical that the one or more geo-fences described herein be circular, but rather can take a variety of shapes (square, rectangular, irregular, etc.,) to adapt to the needs of a particular situation.

When the driver of the delivery vehicle 12 arrives at a location where he or she plans to deliver (i.e., leave) the item 14, the driver can scan the item for a tracking number 28, which is used for uniquely identifying the item during the shipping process. In practice, this location may or may not be the correct (i.e., designated) delivery point 20 where the item is supposed to be delivered. As such, the monitoring system 10, using the functionality described herein, can be used to prevent or detect what may be a misdelivery of the item 14 to an incorrect address. In other embodiments, the data capture event of obtaining the tracking number 28 (or other such item identifier) from the item 14 may be performed by (or involve) other individuals and/or systems, such as might occur when an item arrives at a sorting hub or a shipping port. Preferably, the tracking number 28 has been physically associated with the item 14 using one or more known techniques including, for example, having it encoded on a barcode, stored on a RFID tag, or printed as human-readable indicia on a shipping label.

In the embodiment shown, a portable computing device 30, equipped with an appropriate data capture device, can be used by the driver of the delivery vehicle 12 to obtain the tracking number 28 from the item 14. Once obtained, the tracking number 28 identifying the item 14 can be used by the computing device 30 to access (locally or remotely) a set of predetermined coordinates that define the inner geo-fence 26 around the designated delivery point 20. As described below, this data can be used by the device 30 to determine, among other things, whether the item is being delivered to the correct delivery point 20. The computing device 30, as indicated in FIG. 2, is also configured to receive and process GPS data from a GPS system 50. This allows the computing device 30 to determine its own geographic location at the time at which the destination scan of the item 14 takes place, thus providing an approximate location for where the driver of the delivery vehicle 12 intends to deliver/leave the item 14.

Those of ordinary skill in the art will readily recognize that the above-described operations need not be performed by a single device, but rather could be performed by a plurality of devices, each providing input on one or more of the functions described above. For example, a separate GPS unit located on the delivery vehicle 12 may be used to relay location data to the computing device 30 at or near the time of the scanning. Or, as indicated above, a separate data capture device, not integral to the computing device 30, may be used to obtain the tracking number 28 from the item 14. In yet another embodiment, all such data may be obtained using one or more devices that transmit the data to a remote system, which performs the appropriate processing to determine whether a problem has arisen with regard to the transport or delivery of the item 14.

In order to determine whether or not the item 14 is being delivered to the correct (i.e., designated) delivery point 20, the computing device 30 can be programmed to automatically compare the GPS coordinates of the actual delivery location (i.e., the location of the destination scan) to the retrieved coordinate data defining the bounds of the inner geo-fence 26. If the computing device 30 determines that the scan location falls within the inner geo-fence 26, then delivery of the item 14 is assumed to be taking place at the designated delivery point 20. If, however, it is found that the scan location does not fall within the inner geo-fence 26, an alert can be generated indicating that a potential misdelivery of the item to an incorrect address is occurring. In one embodiment, the alert can be transmitted from the computing device 30 to a remote central monitoring system 70 via wireless means so as to notify appropriate transportation or security personnel (and systems), other than the driver.

As indicated above, the computing device 30 can also be configured to determine the time and date (i.e., timestamp data) at which a scanning of the item 14 took place at a destination/delivery location. As such, the computing device 30 can also be programmed to compare this timestamp data to a known time window during which the item 14 is scheduled to be delivered. Data defining the scheduled delivery window, as with the data defining the one or more geo-fences 24, 26, can be stored in association with the tracking number 28, which identifies the item 14. If, by using such data, the computing device 30 determines that a delivery of the item 14 is occurring at a time/date that falls outside of the scheduled delivery window, then an alert can be generated to the driver and/or the remote central monitoring system 70.

Similarly, if, by a certain time (e.g., the end of the scheduled delivery window), there has been no indication that the item 14 has been delivered to the delivery point 20, or any other delivery location for that matter, the monitoring system 10 can be configured to generate an alert. In one embodiment, the computing device 30 can be programmed to generate an alert if a destination scan of the item 14 has not occurred by a certain time, such as the end of the scheduled delivery window. In another embodiment, the remote response system 70 can be programmed to generate an alert if it has not received, by a certain time, a communication from the computing device 30 (or any other related device) confirming delivery of the item 14. This type of alert may indicate, for example, that the item 14 has been lost or stolen, or that it is simply behind schedule. In any event, generation of this and other such alerts described herein allow appropriate personnel to be made aware of any potential problems associated with a particular item 14 much sooner than might otherwise occur.

Figure 3:
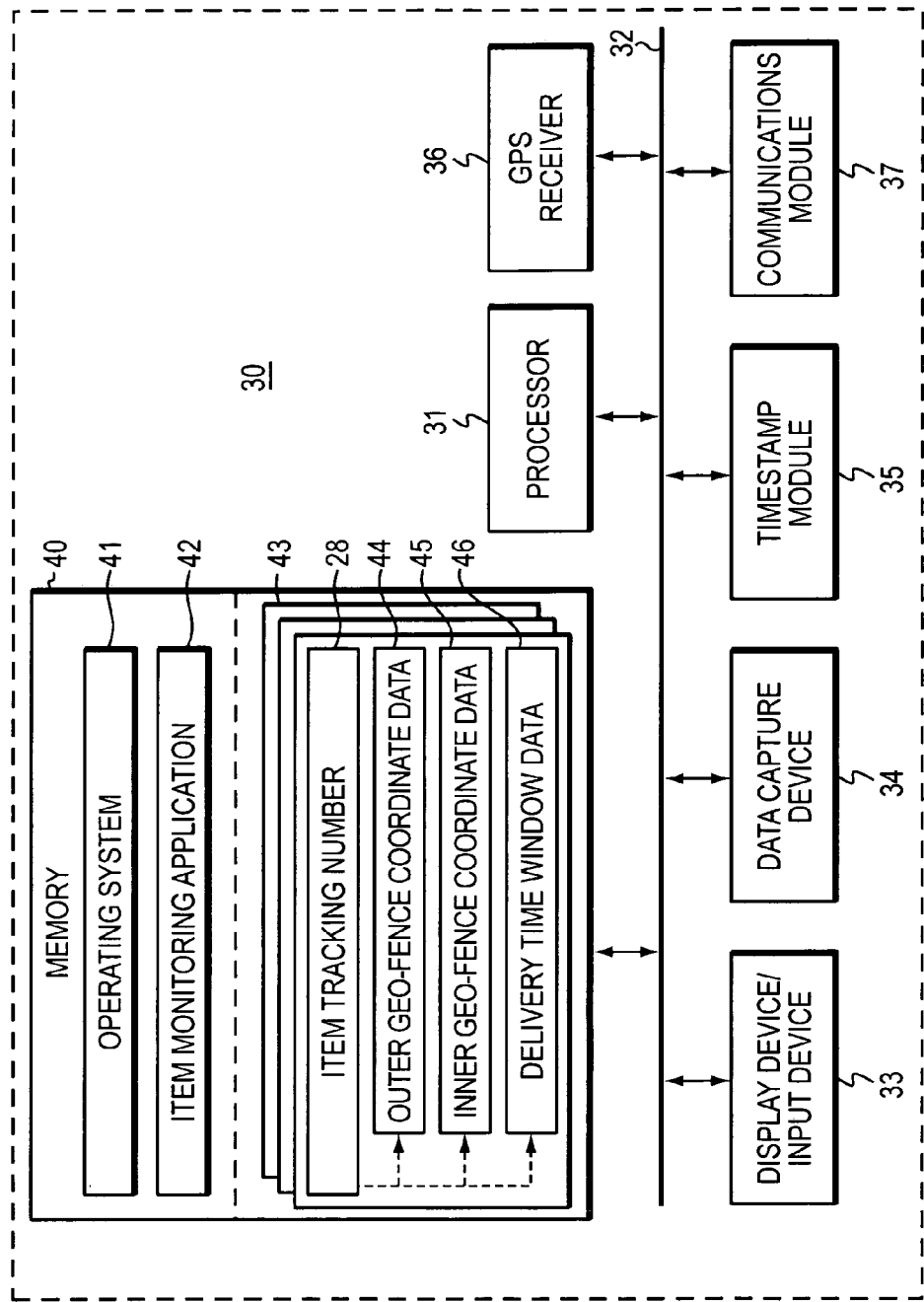
FIG. 3 shows a block diagram of an exemplary embodiment of the computing device of FIG. 2 in accordance with an embodiment of the present invention.

Reference is now made to FIG. 3, which shows a block diagram of an exemplary embodiment of the computing device 30 of FIG. 2. The computing device 30 includes a processor 31 that communicates with other elements within the device via a system interface or bus 32. Also included in the computing device 30 is a display device/input device 33, a data capture device 34, and a timestamp module 35, which can be used to associate time and date information with each data capture event. The display device/input device 33 may be, for example, a keyboard, touchpad or pointing device that is used in combination with a display screen or monitor. The data capture device 34 may be a barcode reader, a RFID interrogator or any other type of automated or manual data capture device that is known in the art. The computing device 30 further includes a GPS receiver 36 for receiving GPS data, and a communications module 37 that allows the processor 31 to communicate wirelessly (or otherwise) with the central monitoring system 70 and other related devices and systems, using for example, one of the IEEE 802.11 protocols, 802.15.4 protocol, or a standard 3G wireless telecommunications protocol, such as CDMA2000 1× EV-DO, GPRS or W-CDMA.

The computing device 30 also includes memory 40, which is used to store a number of program modules and data items, such as an operating system 41, an item monitoring application 42, and one or more item-related data sets 43, each of which is associated with a corresponding item 14 that is to be delivered to a designated delivery point 20 pursuant to one or more of the monitoring aspects described above. The item monitoring application 42 is used for controlling certain aspects of the item monitoring system 10. In the embodiment shown, each data set 43 associated with an item 14 includes a tracking number 28 used to identify that item, and related outer geo-fence coordinate data 44 defining an outer geo-fence 24, inner geo-fence coordinate data 45 defining an inner geo-fence 26, and delivery time-window data 46 for identifying a time during which the item is scheduled to be delivered. Some or all of the data in each item-related data set 43 may be used by the processor 31 when executing the item monitoring application 42 in relation to that item.

The memory 40 can be considered either primary memory, that is RAM or other forms which retain the contents only during operation, or it may be non-volatile, such as ROM, EPROM, EEPROM, FLASH, or other types of memory that retain the memory contents at all times. The memory 40 could also be secondary memory, such as disk storage, that stores large amount of data.

Figure 4:
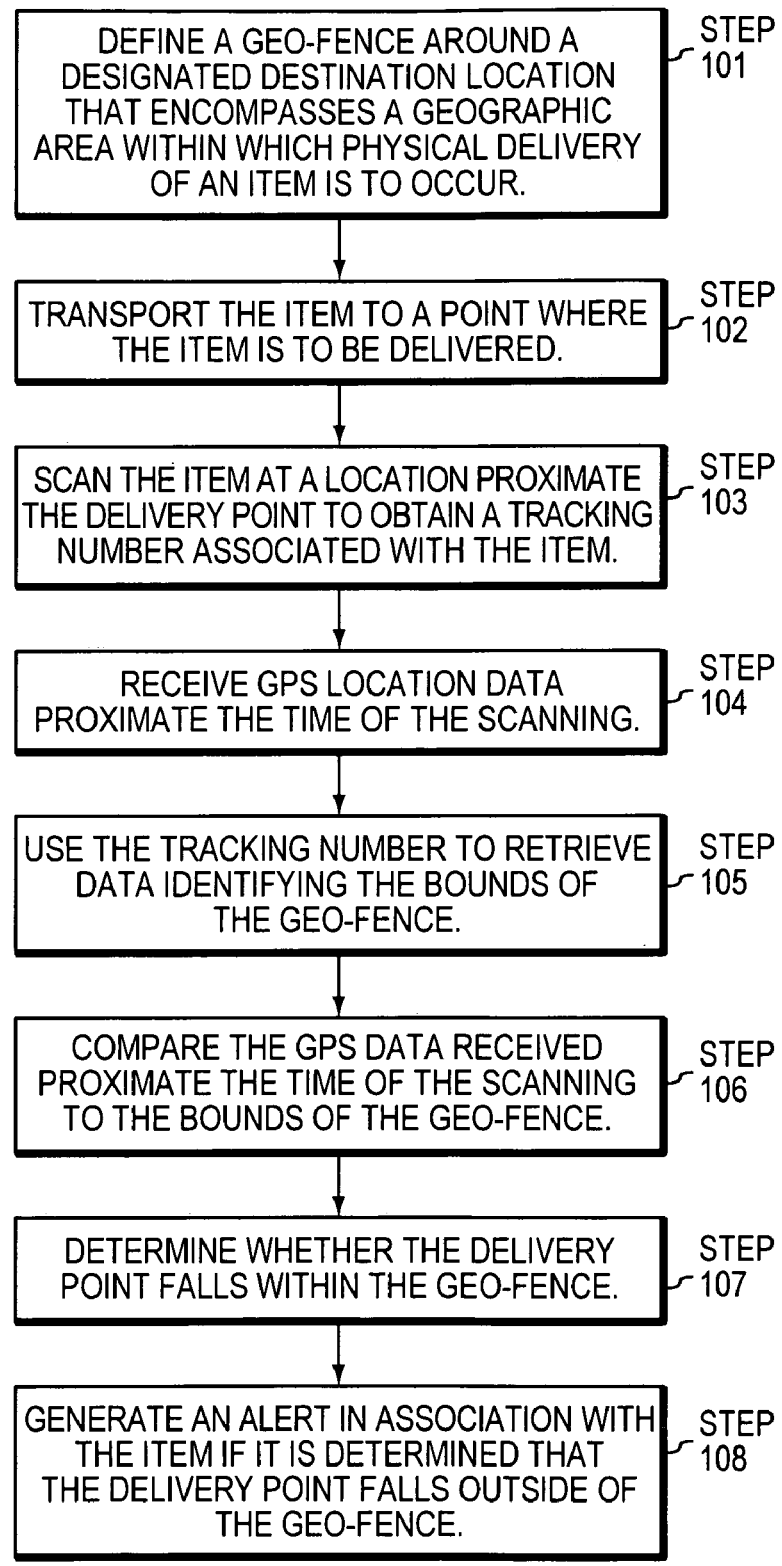
FIG. 4 is a process flow diagram that illustrates the steps for monitoring the delivery of an item to a designated delivery point pursuant to at least one geo-fence being placed around such location in accordance with an embodiment of the present invention.

FIG. 4 is a process flow diagram that illustrates the steps for monitoring the delivery of an item 14 to a designated delivery point 20 pursuant to at least one geo-fence 26 being placed around such location in accordance with an embodiment of the present invention. At Step 101, a geo-fence 26 is defined around the designated delivery point 20. The geo-fence 26 is defined so as to encompass a geographic area or zone within which physical delivery of the item 14 is to occur, and, in general, is configured so as to provide an accurate indication of whether or not a delivery of the item 14 is occurring at the correct delivery point 20. In one embodiment, the geo-fence 26 can be set up to enclose an area approximately 1000 feet in radius from a selected point proximate the designated delivery point 20. This distance is of course only exemplary and could be varied as needed. A scheduled delivery window 46 may also be defined in associated with the item 14. Such scheduling data 46 allows the monitoring system 10 to determine not only whether the item 14 is being delivered to the correct geographic location 20, but also whether it has been delivered by or during an expected time.

At Step 102, the item 14 is transported via a delivery vehicle 12 to a point where the item is to be delivered. In practice, this location may or may not be the correct (i.e., designated) delivery point 20 where the item is suppose to be delivered. To help determine whether or not this is the case, at Step 103, the item 14 is scanned at a location proximate the delivery point to obtain a tracking number 28, which is used for uniquely identifying the item during the shipping process. Also, at Step 104, GPS location data is received proximate the time of the scanning. The GPS location data received proximate the time of the scanning provides an estimate of the actual location to which the item 14 is being delivered. To determine whether this location is in fact the correct delivery location 20, the tracking number 28, at Step 105, is used to retrieve coordinate data 44 that identifies the bounds of the geo-fence 26. At Step 106, the coordinate data 44 identifying the bounds of the geo-fence 26 is compared to the GPS data received proximate the time of the scanning. As such, at Step 107, it can be determined whether or not the actual delivery point falls within the geo-fence 26.

If the actual delivery point does not fall within the geo-fence 26, then, at Step 108, an alert can be generated in association with the item 14. This alert can be used to provide an indication to the driver of the delivery vehicle 12 (and/or transportation or security personnel via the remote central monitoring system 70) that a misdelivery of the item 14 to an incorrect address may be occurring. Similarly, if it is determined that the item 14 has not been delivered by a certain time or within a scheduled delivery window 46, then an alert can be generated so as to indicate this as well. In this way, proper procedures can be taken to promptly investigate and possibly remedy any potential problems that have arisen during the course of delivering the item 14 to its designated delivery point 20.

Figure 5:
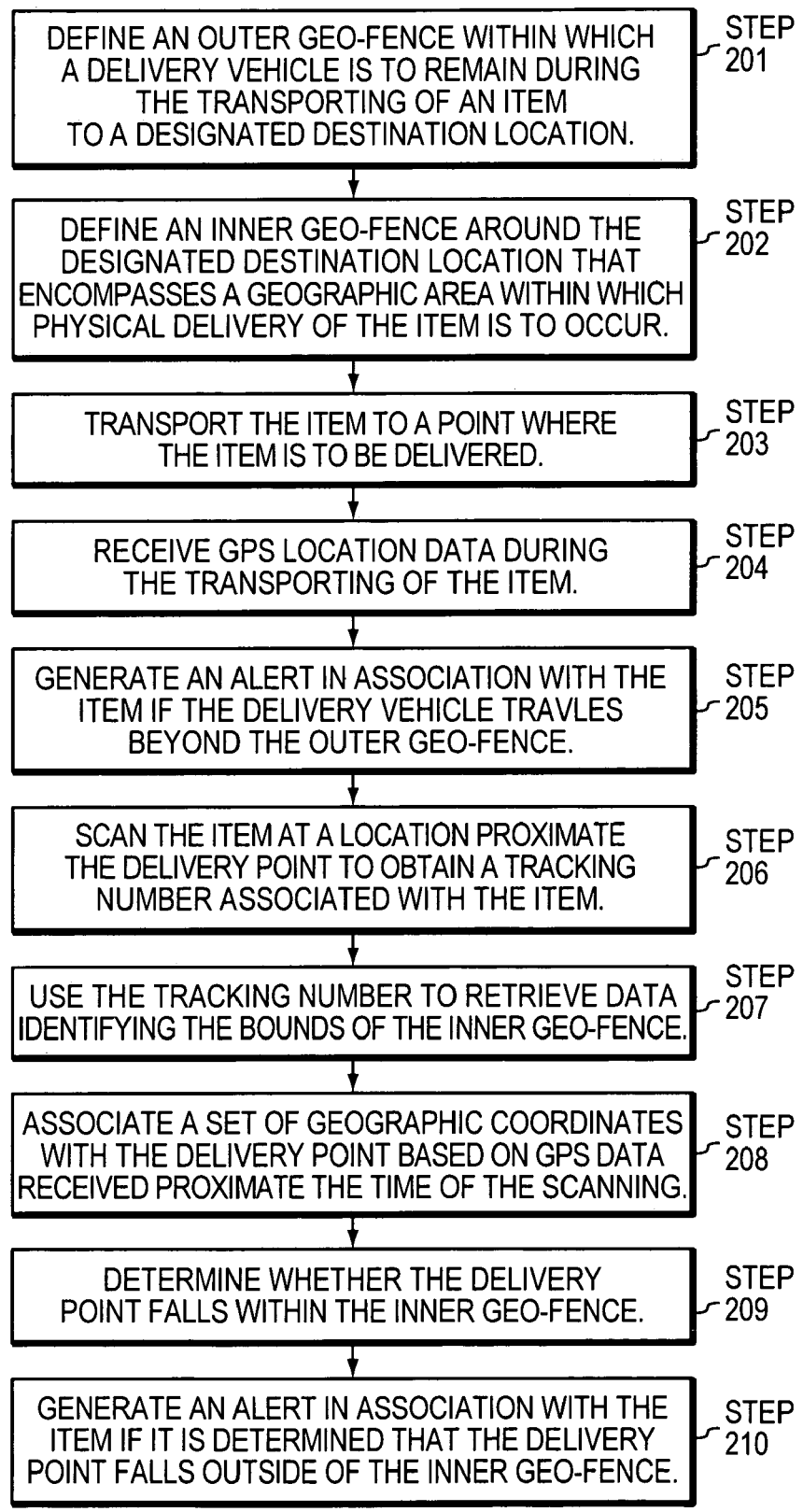
FIG. 5 is a process flow diagram that illustrates the steps for monitoring the delivery of an item to a designated delivery point pursuant to at least two geo-fences being placed around such location in accordance with an embodiment of the present invention.

FIG. 5 is a process flow diagram that illustrates the steps for monitoring the delivery of an item 14 to a designated delivery point 20 pursuant to at least two geo-fences 24, 26 being placed around such location in accordance with another embodiment of the present invention. In this embodiment, an outer geo-fence 24, at Step 201, is defined so as to encompass an area or zone within which a delivery vehicle 12 is expected to remain while transporting the item 14. Also, at Step 202, an inner geo-fence 26 is defined around the designated delivery point 20 to encompass a geographic area or zone within which physical delivery of the item is to occur. The inner geo-fence 26 is again configured in such a way as to provide an accurate indication of whether or not a delivery of the item 14 is occurring at the correct delivery point 20. With both the outer and inner geo-fences 24, 26 defined, the item 14, at Step 203, is transported via the delivery vehicle 12 to a point where the item is to be delivered (i.e., left). This location may or may not be the correct delivery point 20 to which the item 14 is expected to be delivered. To help determine whether this is the case, GPS location data, as indicated by Step 204, is received by one or more on-board devices moving with the delivery vehicle 12 during the transporting of the item 14.

If the monitoring system 10 determines that the delivery vehicle 12 has traveled beyond the outer geo-fence 24 while transporting the item 14, then, at Step 205, a corresponding alert can be generated in association with that item. The size and dimensions of the area defined by the outer geo-fence 24 can be determined in advance based at least in part on known parameters associated with the item 14. The amount of deviation permitted from any given course may, in some cases, depend on the level of scrutiny that is to be paid to a particular item 14 being transported by the delivery vehicle 12. Thus, in some cases, an alert may only be generated if the delivery vehicle 12 travels beyond the outer geo-fence 24 by a substantial amount (e.g., more than one mile). In other situations, strict adherence to a particular course, as defined by an outer geo-fence 24 associated with a particular item 14, may be required to avoid generating an alert.

In one embodiment, an on-board computing device 30 used by the driver of the delivery vehicle 12 is programmed to continuously compare the current location of the delivery vehicle to a set of known coordinates that define the outer geo-fence 24 associated with the item 14. If the computing device 30 determines that the vehicle 12 has traveled into an area beyond the outer geo-fence 24, an alert will be generated in association with that item so as to notify the driver and/or appropriate transportation or security personnel.

At Step 206, the item 14 is scanned at a location proximate the delivery point to obtain a tracking number 28, and, at Step 207, the tracking number 28 is used to retrieve coordinate data 44 that identifies the bounds of the inner geo-fence 26. At Step 208, a set of geographic coordinates is associated with the delivery point based on GPS data received proximate the time of the scanning. The GPS location data received proximate the time of the scanning provides an indication of the actual location to which the item 14 is being delivered. At Step 209, the process proceeds by determining whether the actual delivery point falls within the inner geo-fence 26. If the actual delivery point does not fall within the inner geo-fence 26, then, at Step 210, an alert can be generated in association with the item 14. This alert can again be used to provide an indication to the driver of the delivery vehicle 12 (and/or transportation or security personnel via the remote central monitoring system 70) that a misdelivery of the item 14 to an incorrect address or location may be occurring.

As with other embodiments described above, it may also be the case that a scheduled delivery window 46 is defined in associated with the item 14. Such scheduling data 46 allows the monitoring system 10 to determine not only whether the item 14 is being delivered to the correct geographic location 20, but also whether it has been delivered by or during an expected time. If it is determined that the item 14 has not been delivered by a certain time or within a scheduled delivery window 46, then an alert can be generated to indicate this as well. As such, proper procedures can be taken to promptly investigate and possibly remedy any potential problems that have arisen during the course of delivering the item 14 to its designated delivery point 20.

Figure 6:
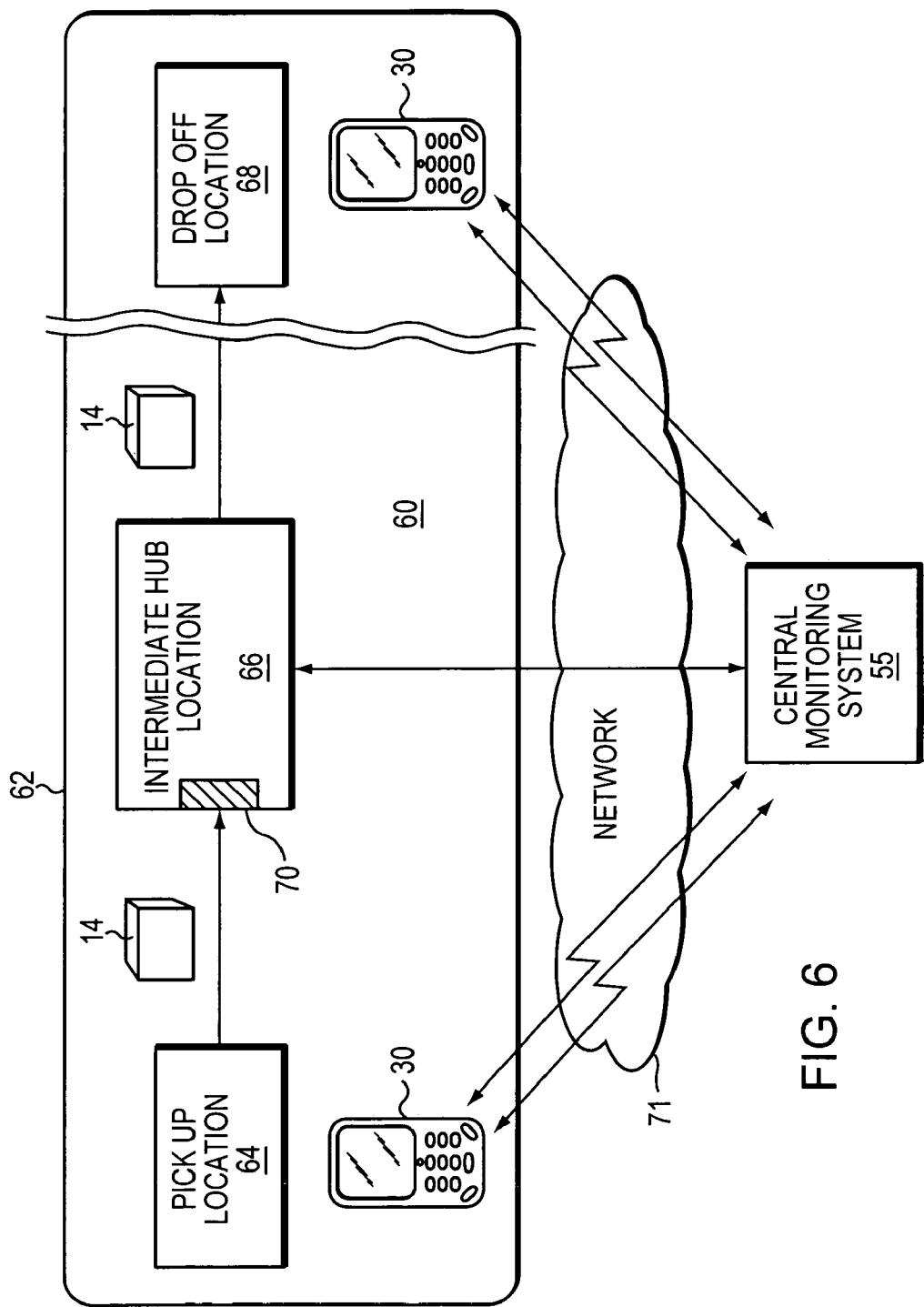
FIG. 6 illustrates how the monitoring system can be configured to monitor the movement of an item through a transportation network in accordance with an embodiment of the present invention.

Reference is now made to FIG. 6, which illustrates how the system 10 can be configured to monitor the movement of an item 14 through a transportation network 60 in accordance with an embodiment of the present invention. A geo-fence 62 is defined so as to encompass a predetermined delivery route, or some portion thereof, that the item 14 is generally expected to follow over the course of its movement through the transportation network 60. In particular, the item 14 is depicted as moving from a pickup location 64 to an intermediate hub location 66, and then on to a drop off location 68. As such, the geo-fence 62 can be defined to encompass a geographic area that includes at least these three points. In practice, there may be multiple intermediate locations other than the single hub location 66 shown. Similarly, the drop off location 68 need not be the ultimate destination of the item 14. One or more additional geo-fences of varying scope (not shown) can also be layered or defined around any given point within the transportation network 60 for which additional monitoring capabilities are desired. For example, in one embodiment, one or more additional geo-fences can be configured around either or both of the intermediate hub location 66 and the drop off location 68. This may occur, for example, when there is a requirement that the item 14 pass through (or be delivered to) a particular location by or during a particular time.

The item 14 is typically scanned at each point within the transportation network 60 through which it passes. For instance, the item 14 can be scanned with a first portable device 30 at the pickup location 64 and with a second portable device at the drop off location 68. The item 14 can also be scanned using one or more stationary devices 70. This is likely to occur at "fixed" points within the transportation network 60, such as at the intermediate hub location 66 shown. As described above, geographic location data can be associated with each point at which the item 14 is scanned. Based at least in part on this data, a determination can be made as to whether or not the item 14 is progressing along a predetermined delivery route, or some portion thereof, which the item is generally expected to follow over the course of its movement through the transportation network 60.

The approximate geographic location of each point at which the item 14 is scanned can be determined in a number of ways. For example, at some locations, such as the pickup location 64 and the drop location 68, respective portable computing devices 30 can be equipped with GPS receivers, or other such location means, that allow the devices 30 to determine their approximate location at the time that a scanning of the item 14 takes place. The present invention also contemplates, for example, the use of various cellular or wireless triangulation techniques, which are known in the art or may be developed in the future. As with GPS, such techniques can be used by the portables devices 30 (or devices in communication therewith) to determine the approximate location of a particular scanning event. In other cases, the geographic location at which a scanning event takes place may already be known to the system 10 by virtue of the fact that the scanning of the item 14 is performed by a stationary device 70 positioned at a known location, such as the intermediate hub location 66.

Data associated with some or all such scanning events, including location and timestamp data, can be transmitted via a communications network 71 to the central monitoring system 55. In one embodiment, if the central monitoring system 55 determines that the item 14 has been scanned at a point that does not fall within the geographic area defined by the geo-fence 62, or that the item has not been scanned at or near an expected location (e.g., drop off location 68) by a particular time, then an alert can be generated in association with that particular item. One of ordinary skill in the art will appreciate that, in other embodiments, some or all of the processing performed by the monitoring system 55 can be performed locally by, for example, the portable devices 30 or related systems positioned at the one or more intermediate hub locations 66.

Figure 7:
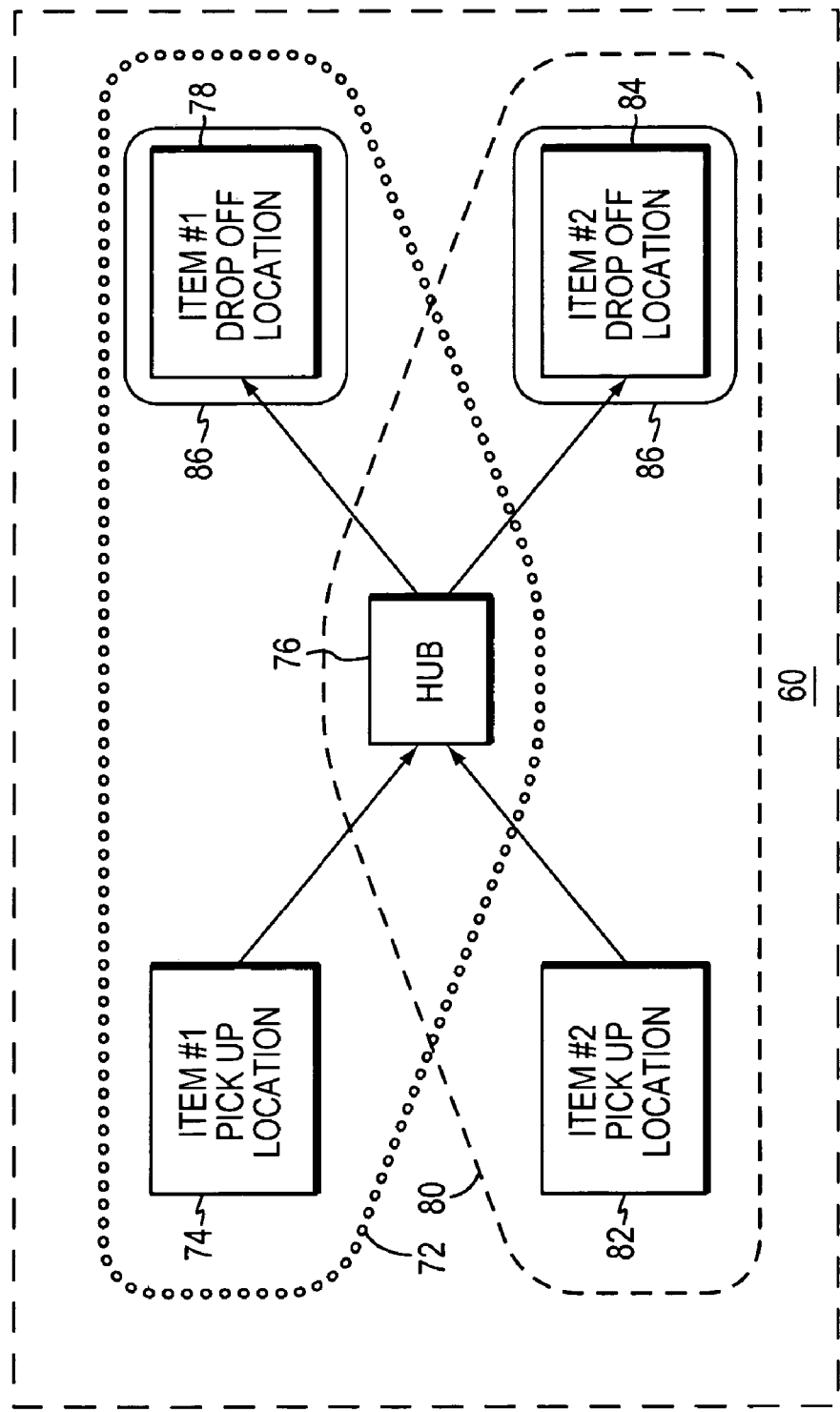
FIG. 7 illustrates how the monitoring system can be configured to monitor the movement of multiple items through a transportation network in accordance with an embodiment of the present invention.

In accordance with yet another embodiment of the present invention, FIG. 7 illustrates how the system 10 can be configured to monitor the movement of multiple items 14 through a transportation network 60. A first geo-fence 72 is defined so as to encompass a first predetermined delivery route, or some portion thereof, that a first item 14 is generally expected to follow over the course of its movement through the transportation network 60. In particular, the first item 14 is depicted as moving from a first pickup location 74 to an intermediate hub location 76, and then on to a first drop off location 78. As such, this first geo-fence 72 is defined to encompass a geographic area that includes at least these three points. Similarly, a second geo-fence 80 is defined so as to encompass a second predetermined delivery route, or some portion thereof, that a second item 14 is generally expected to follow over the course of its movement through the transportation network 60. In this case, the second item 14 is depicted as moving from a second pickup location 82 to the intermediate hub location 78, and then on to a second drop off location 84. In practice, each item 14 may pass through multiple intermediate locations other than the single hub location 76. If it is determined that either of the items 14 have been transported to a location outside of their respective geo-fences 72, 80, an appropriate alert can be generated in association with that item.

Also depicted around each of the respective drop off locations 78, 84 is an "inner" (or more localized) geo-fence 86, which facilitates yet another layer of visibility as to whether each of the items 14 is properly delivered to its respective drop off location. Each inner geo-fence 86 defines an area within which physical delivery of the corresponding item 14 is deemed (or assumed) to be proper. In other words, if the monitoring system 10 determines that the item 14 has been delivered to a location within the geographic area defined by the inner geo-fence 86, then the system 10 assumes that the item 14 has been delivered to the correct drop off location 78, 84. If on the other hand, the system 10 determines that the item 14 has been delivered to a point located outside of the inner geo-fence 86, then an appropriate alert can be generated to indicate, for example, that a potential misdelivery of the item 14 has occurred. This and other such alerts allow appropriate personnel to begin an immediate inquiry into whether anything has in fact gone wrong with regard to the transport and delivery of that particular item. In yet another embodiment, additional geo-fences can be layered or defined around one or more intermediate transportation locations, including, for example, intermediate hub location 76.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A method of monitoring whether an item is properly delivered to a designated delivery point via a delivery vehicle, said method comprising the steps of:
   (1) storing first data relating to a first geographic boundary in a storage device, said first geographic boundary defining an area within which said delivery vehicle is to remain during the transport of said item to said designated delivery point;
   (2) storing second data in said storage device relating to a second geographic boundary, said second geographic boundary defining an area around said designated delivery point within which physical delivery of said item is to occur;
   (3) performing a destination scan of said item at an actual delivery point to which said item has been transported, said destination scan used, at least in part, for indicating that said item has reached said actual delivery point;
   (4) receiving one or more notifications from a computing device configured to receive and process geographic location data during the transport and delivery of said item to said actual delivery point, said one or more notifications including sufficient information to facilitate a determination of whether said delivery vehicle has traveled outside of said area defined by said first geographic boundary, and whether said actual delivery point is located within said area defined by said second geographic boundary;
   (5) in response to said notification that said delivery vehicle has traveled outside of said area defined by said first geographic boundary, generating a first alert in association with said item; and
   (6) in response to said notification that said actual delivery point is not located within said area defined by said second geographic boundary, generating a second alert in association with said item.

2. The method of claim 1, wherein said first and second alerts are transmitted from said computing device to a central monitoring system via a wireless transmission.

3. The method of claim 1, wherein at least one of said first and second alerts is presented to a driver of the delivery vehicle being used to transport said item to said actual delivery point.

4. The method of claim 1, wherein said geographic location data is GPS data received via a wireless device.

5. A system for monitoring whether an item is properly delivered to a designated delivery point via a delivery vehicle, said system comprising:
   (1) a memory module for:
      (a) storing first data relating to a first geographic boundary, said first geographic boundary defining an area within which said delivery vehicle is to remain during the transport of said item to said designated delivery point; and
      (b) storing second data relating to a second geographic boundary, said second geographic boundary defining an area around said designated delivery point within which physical delivery of said item is to occur;
   (2) a data capture device for capturing a tracking number associated with said item proximate an actual delivery point to which said item has been transported;
   (3) a location module for monitoring the geographic location of said delivery vehicle and said item during the transport and delivery of said item to said actual delivery point; and
   (4) a processing module operable to communicate with said memory module, said data capture device and said location module, said processing module configured for:
      (a) generating a first alert in association with said item in response to a determination being made that said delivery vehicle has traveled outside of said area defined by said first geographic boundary; and
      (b) generating a second alert in association with said item in response to a determination being made that said actual delivery point is not located within said area defined by said second geographic boundary.

6. The system of claim 5, wherein said first and second alerts are transmitted from said computing device to a central monitoring system via a wireless transmission.

7. The system of claim 5, wherein at least one of said first and second alerts is presented to a driver of the delivery vehicle being used to transport said item to said actual delivery point.

8. The system of claim 5, wherein said geographic location data is GPS data received via a wireless device.

9. A method of monitoring whether an item is properly delivered to a designated delivery point via a delivery vehicle, said method comprising the steps of:

(1) storing first data relating to a first geographic boundary in a storage device, said first geographic boundary defining an area within which said delivery vehicle is to remain during the transport of said item to said designated delivery point;

(2) storing second data in said storage device relating to a second geographic boundary, said second geographic boundary defining an area around said designated delivery point within which physical delivery of said item is to occur;

(3) storing a commit time in said storage device by which said item is expected to be delivered to said designated delivery point;

(4) performing a destination scan of said item at an actual delivery point to which said item has been transported, said destination scan used, at least in part, for determining that said item has reached said actual delivery point;

(5) receiving one or more notifications from a computing device configured to receive and process geographic location data and time data during the transport and delivery of said item to said actual delivery point, said one or more notifications including sufficient information to facilitate a determination of:

(a) whether said delivery vehicle has traveled outside of said area defined by said first geographic boundary;

(b) whether said actual delivery point is located within said area defined by said second geographic boundary; or (c) whether said destination scan of said item has occurred by said commit time;

(6) in response to said notification that said delivery vehicle has traveled outside of said area defined by said first geographic boundary, generating a first alert in association with said item; and (7) in response to said notification that said actual delivery point is not located within said area defined by said second geographic boundary or that said destination scan of said item has not occurred by said commit time, generating a second alert in association with said item.

10. The method of claim 9, wherein said first and second alerts are transmitted from said computing device to a central monitoring system via a wireless transmission.

11. The method of claim 9, wherein at least one of said first and second alerts is presented to a driver of the delivery vehicle being used to transport said item to said actual delivery point.

12. A system for monitoring whether an item is properly delivered to a designated delivery point via a delivery vehicle, said system comprising:

(1) a memory module for:

(a) storing first data relating to a first geographic boundary, said first geographic boundary defining an area within which said delivery vehicle is to remain during the transport of said item to said designated delivery point; and (b) storing second data relating to a second geographic boundary, said second geographic boundary defining an area around said designated delivery point within which physical delivery of said item is to occur;

(2) a data capture device for capturing a tracking number associated with said item proximate an actual delivery point to which said item has been transported;

(3) a location module for monitoring the geographic location of said delivery vehicle and said item during the transport and delivery of said item to said actual delivery point;

(4) a timestamp module for associating a time and date with the capturing of said tracking number at said actual delivery point; and (5) a processing module operable to communicate with said memory module said data capture device, said location module and said timestamp module, said processing module configured for:

(a) generating a first alert in association with said item if it is determined that said delivery vehicle has traveled outside of said area defined by said first geographic boundary; and (b) generating a second alert in association with said item if it is determined that said actual delivery point is not located within said area defined by said second geographic boundary, or if it is determined that said destination scan of said item has not occurred by said commit time.

13. The system of claim 12, wherein said first and second alerts are transmitted from said computing device to a central monitoring system via a wireless transmission.

14. The system of claim 12, wherein at least one of said first and second alerts is presented to a driver of the delivery vehicle being used to transport said item to said actual delivery point.

15. A portable computing device for monitoring whether an item is properly delivered to a designated delivery point via a delivery vehicle, said system comprising:

(1) a memory module for:

(a) storing first data relating to a first geographic boundary, said first geographic boundary defining an area within which said delivery vehicle is to remain during the transport of said item to said designated delivery point; and (b) storing second data relating to a second geographic boundary, said second geographic boundary defining an area around said designated delivery point within which physical delivery of said item is to occur;

(2) a data capture device for capturing a tracking number associated with said item proximate an actual delivery point to which said item has been transported;

(3) a location module for monitoring the geographic location of said delivery vehicle and said item during the transport and delivery of said item to said actual delivery point;

(4) a timestamp module for associating a time and date with the capturing of said tracking number at said actual delivery point; and (5) a processing module operable to communicate with said memory module, said data capture device, said location module and said timestamp module, said processing module configured for:

(a) generating a first alert in association with said item if it is determined that said delivery vehicle has traveled outside of said area defined by said first geographic boundary; and (b) generating a second alert in association with said item if it is determined that said actual delivery point is not located within said area defined by said second geographic boundary, or if it is determined that said destination scan of said item has not occurred by said commit time.

* * * * *